United States Patent [19]
Gibbs

[11] 3,753,528
[45] Aug. 21, 1973

[54] LUBRICATION SYSTEM
[75] Inventor: Gerald W. Gibbs, Lawrenceville, Ga.
[73] Assignee: Consolidated Foods Corporation, Atlanta, Ga.
[22] Filed: Apr. 13, 1972
[21] Appl. No.: 243,763

[52] U.S. Cl.................... 239/61, 239/412, 137/99, 222/134
[51] Int. Cl............................................. B05b 7/26
[58] Field of Search.................. 239/61, 412, 407; 169/14, 15; 222/134; 137/98, 99, 100

[56] References Cited
UNITED STATES PATENTS
| | | | |
|---|---|---|---|
| 2,567,997 | 9/1951 | Granberg | 169/15 X |
| 3,151,778 | 10/1964 | Olney et al. | 222/134 |
| 3,554,323 | 1/1971 | Wheelock | 137/98 X |
| 3,053,842 | 9/1962 | Meissner | 137/99 X |
| 3,054,417 | 9/1962 | Corvisier | 137/99 |
| 3,232,585 | 2/1966 | Garbarino, Jr. et al. | 137/99 X |

*Primary Examiner*—M. Henson Wood, Jr.
*Assistant Examiner*—John J. Love
*Attorney*—Carlton Hill, Donald J. Simpson et al.

[57] ABSTRACT

The present invention is directed to a device for insuring a proper concentration of a lubricant in a water and lubricant mixture being sprayed through spray nozzles onto moving parts such as conveyors, chain belts and trolleys, characterized by a fluid-actuated motor driving a pump which meters the lubricant into the flow of water in direct proportion to the amount of water being utilized by the system of spray nozzles to insure a constant concentration thereof. In the preferred embodiment, the motor is a reciprocating piston connected to a diaphragm pump utilizing a plunger which is adjustably connected to the piston rod of the motor to enable an adjustment in the output of the pump to vary the concentration of the lubricant in the water and lubricant mixture. Preferably, the water leaving the fluid-actuated motor and the output of the pump are mixed in a mixing chamber prior to being sprayed through the nozzle system and the speed of the motor is controlled through a pressure regulator means disposed in the waterline connected to the inlet port of the motor.

5 Claims, 5 Drawing Figures

LUBRICATION SYSTEM

BACKGROUND OF THE INVENTION

1. Field of the Invention

The present invention is directed to a fluid-actuated metering device for metering liquid lubricant into a flow of water which is subsequently sprayed as a lubricating mixture on moving parts.

2. Prior Art

For years in the canning, bottling and other related industries, moving parts such as conveyors, drive chains and trolleys of the machinery have been hand-lubricated with jellied or bar soaps. Improper lubrication of the conveyors, drive chains or trolleys causes wear in the moving parts due to binding or chattering and also overloading of the drive motors due to high friction.

In recent years, automated systems for bottling and canning, have increased the speed for the moving parts and require a more efficient lubricating system than the hand-operated systems. One suggested system was a gravity feed system which used a drip feed of the lubricant onto the moving parts, but the system was unsatisfactory. Another suggested system was the mixing of a concentrated lubricant with a flow of water which was then sprayed onto the conveyor belts. In such a system, the concentrated lubricant was pumped into the flow by a separately driven pumping unit such as an electrically driven pumping unit, but variations in the water pressure would cause variations in the concentration of the mixture being sprayed through the nozzles. If the concentration of lubricant was less than required, excessive wear would occur in the moving parts. If the concentration of the lubricant in the spray was greater than necessary, a foaming would occur on the moving parts, which is undesirable. Variations in the concentration of the water and lubricant mixture are attributed to changes in the water temperature and pressure.

SUMMARY OF THE INVENTION

The present ieention is directed to a device for supplying a mixture of water and lubricant to a conduit of a system of spray nozzles for spraying moving parts such as conveyors, chain belts and trolleys of canning or bottling equipment which device meters the concentrated lubricant in direct proportion to the flow of water to the spray nozzle to maintain a constant concentration of lubricant in the mixture regardless of variations in the water pressure, temperature of flow rate. The device utilizes a water of fluid-actuated motor which drives a pump that pumps and meters the concentrated lubricant into the flow of water for mixing prior to entering the spray nozzle system. Preferably, the pump is connected to the motor by an adjustable connection to allow variation in the output of the pump to adjust the concentration of the liquid lubricant being metered into the mixture, as desired.

In the preferred embodiment, the motor is a reciprocating double-acting piston having a piston rod connected to a plunger of the pump by an adjustable lost-motion connection with plunger acts against a fluid on one side of a diaphragm to actuate the diaphragm to meter the lubricant on the opposite side of the diaphragm through the pump. In addition to the pump and motor, the device preferably includes a pressure regulator valve to control the pressure of the fluid utilized for driving the motor to control the speed thereof, and a mixing chamber for receiving the exhaust from the motor and the liquid lubricant for mixing prior to entering the spray nozzle system.

DESCRIPTION OF THE PREFERRED EMBODIMENT

Figure 1:
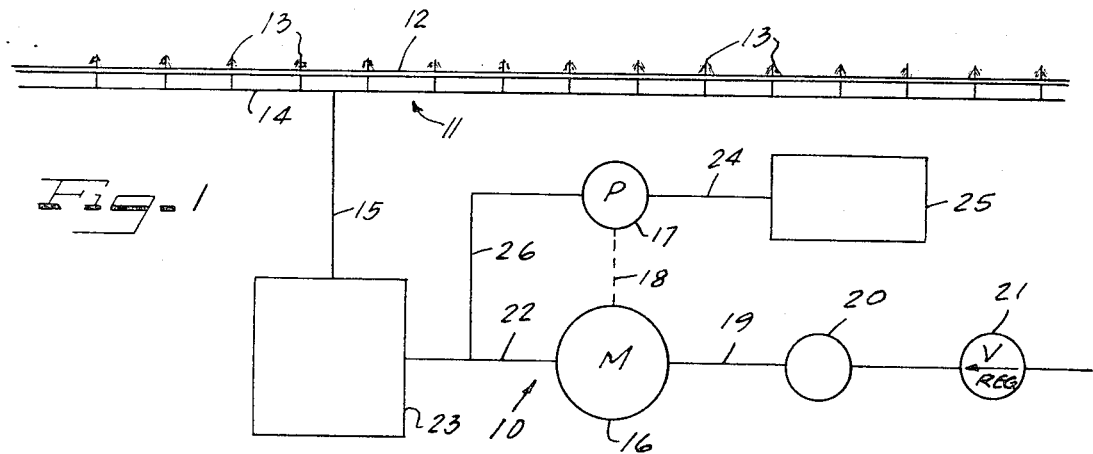
FIG. 1 is a schematic illustration of the device of the present invention utilized in a system of spray nozzles for spraying lubricant on moving parts.

The principles of the present invention are particularly useful when incorporated in a device generally indicated at 10 connected to a system of spray nozzles generally indicated at 11 for spraying a mixture of water and liquid lubricant on a moving part such as a conveyor 12 of a bottling or canning or like apparatus. The system 11 comprises a plurality of nozzles 13 connected to a common or header conduit 14 which is connected by a conduit 15 to the device 10.

The device 10 comprises a fluid-actuated motor 16 driving a pump 17 through a connecting means indicated by dashed lines 18. The motor 16 has an inlet port connected by a conduit 19 to a source of water under pressure which conduit 19 is preferably provided with a filter 20 and a pressure regulator valve 21 for regulating the pressure applied to the motor. An outlet port of the motor is connected by a conduit 22 to the conduit 15 of the system 11 preferably through the mixing chamber 23 which has an outlet port connected to the conduit 15 of the system 11.

The pump 17 has an inlet port connected by a conduit 24 to a container or storage device 25 for the concentrated liquid lubricant and an outlet port connected to a conduit 26 which discharges into conduit 22 so that the lubricant and water are mixed in the conduit 22 and in the mixing chamber 23. Since the pump 17 is driven by the fluid-actuated motor 16, the output of the pump 17 is directionally proportional to the flow of fluid through the motor 16 and results in a constant concentration of the lubricant in the mixture in the chamber 23 flowing through the conduit 15 and 14 to the spray nozzles 13 regardless of the variations in the pressure, flow rate and temperature of the water entering the motor 16.

Figure 4:
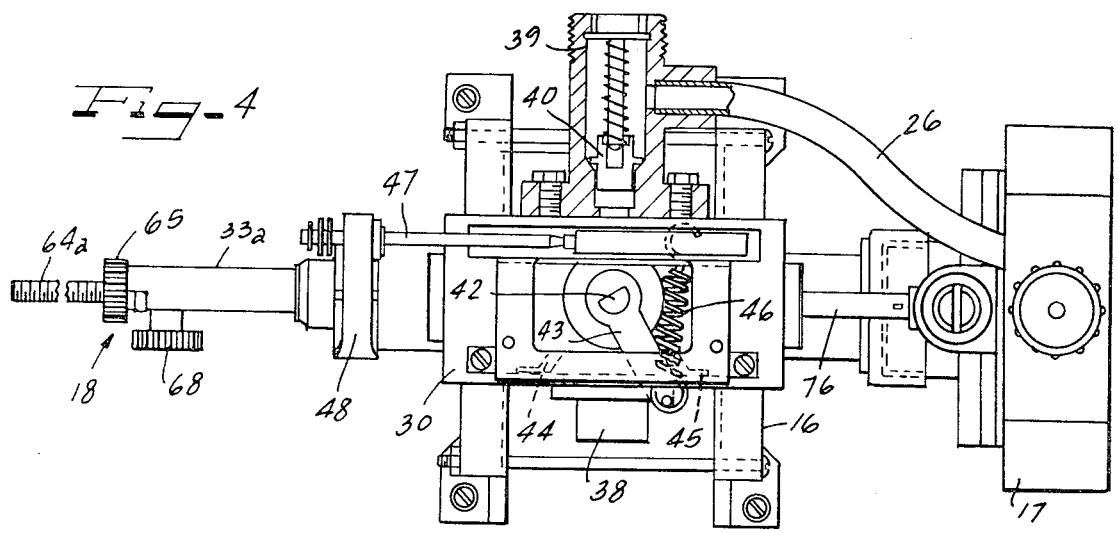
FIG. 4 is a plan elevation with parts in cross section for purposes of illustration of the motor and pump device of the present invention.
Figure 5:
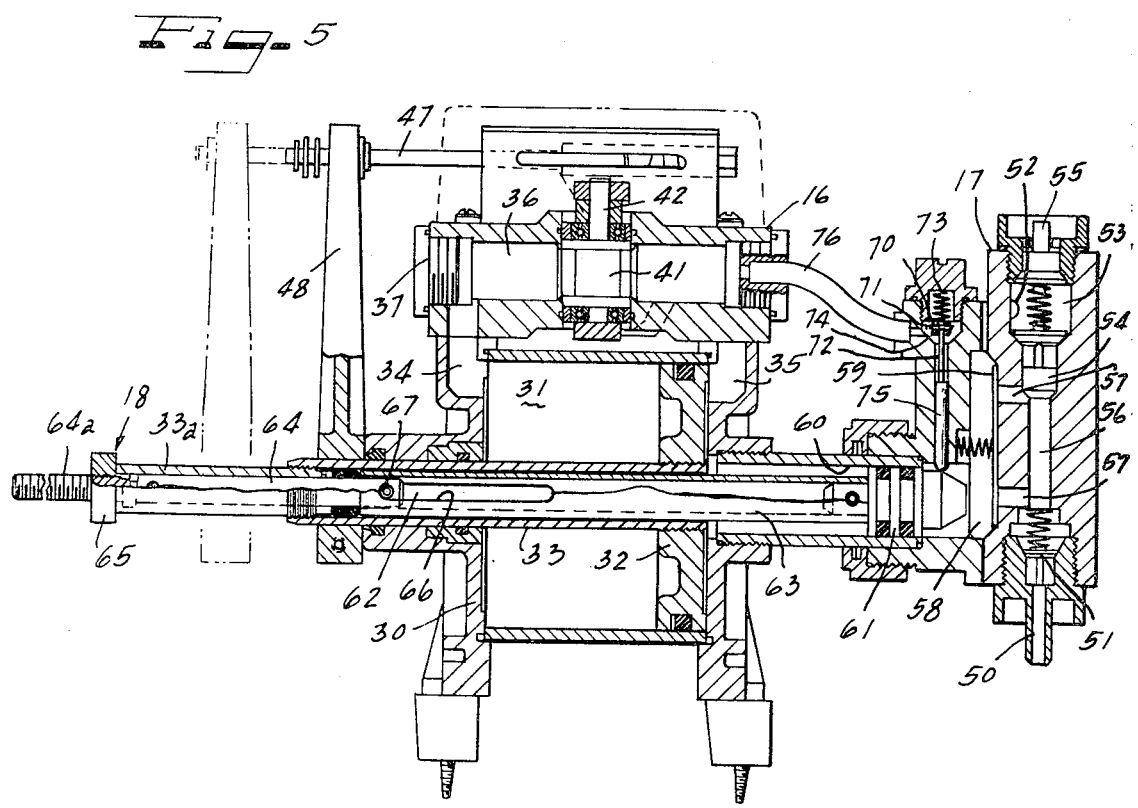
FIG. 5 is a cross sectional view of the pump and motor device of the present invention with parts in elevation for purposes of illustration.

In FIGS. 4 and 5, the preferred structure of the motor 16 and the pump 17 of the device 10 is illustrated. The motor 16 has a housing 30 having a piston chamber 31 receiving a double-action piston 32 connected to a hollow piston rod 33. The chamber 31 has a pair of ports 34 and 35 which extend to a control valve chamber 36 of a control valve means 37. One side of the housing of the control valve means 37 has a coupling 38 adapted for connection to the conduit 19 and acts as the inlet port for the motor 16 to supply water to the chamber 36. The other side of the housing of the valve means 37 has an outlet port 39 which is adapted for connection to the conduit 22 and has a check valve 40 to prevent reverse flow.

To alternatively interconnect the piston chamber ports 34 and 35 to the inlet and outlet ports 38 and 39, the control means 37 contain a valve means illustrated as a butterfly valve 41 mounted on a shaft 42 extending through the housing of the control means 37 and attached to a lever arm 43. The lever arm 43, which is movable between stops 44 and 45, is connected by a spring 46 to a rod 47 connected to an arm 48 carried by the piston rod 33. As the piston 32 reciprocates from the position illustrated in FIG. 5 to the opposite end of the chamber, the rod 47 moves therewith to move one end of the spring 46 to shift the lever arm 43 against the stop 44 when the spring moves over the center of the shaft 42. With the shifting of the lever arm 43 against the stop 44, the butterfly valve 41 is rotated to connect port 34 to the inlet port 38 and the port 35 to the outlet port 39. In the position illustrated in FIG. 4, with the lever arm resting against the stop 45, the valve 41 is positioned to connect the port 34 to the outlet port 39 and the flow from the inlet port 38 to the port 35.

The pump 17 has an inlet port 50 provided with a check valve 51 and an outlet port 52 which has a chamber 53 with a check valve 54 and vent poppet valve 55. The inlet and outlet ports 50 and 52 are interconnected by a bore 56 which has a pair of side bores 57 extending to a chamber or cavity 58 which has a diaphragm 59 subdividing the cavity or chamber 58 into two portions. As illustrated, the diaphragm 59 is pushed or has been deflected to one side to force any lubricant in the cavity 58 out through the bores 57, the check valve 54, and the outlet port 52. On the lefthand side of the diaphragm 59, the cavity 58 is filled with an appropriate fluid such as water, and extends into a bore 60 which has a plunger 61 connected by the connecting means 18 to the piston rod 33 so that the plunger reciprocates in the bore 60 as the piston 32 reciprocates.

As illustrated, the connecting means 18 is adjustable and includes a lost-motion connection 62 between a plunger rod 63 and a member 64 received in the hollow piston rod 33, which has an extension 33a. By adjusting a threaded adjustment knob 65 on the threaded end 64a of the member 64, the lost-motion connection 62, which comprises a slot 66 receiving a pin 67, can be adjusted to vary the length of the stroke of the plunger 61. A variation in the length of the stroke of the plunger 61 will decrease or change the suction applied on the diaphragm 59 to vary its displacement in the cavity 58 to change the volume of lubricant being drawn into the pump 17 and discharge with each reciprocation of the plunger 61. To hold the member 64 in the extension 33a in the adjusted position, a lock device having a knob 68 is provided on the extension 33a.

To prevent applying too much pressure on the diaphragm 59, a relief valve 70 is provided and comprises a cavity 71 containing a poppet valve 72 biased by a spring 73 against a seat 74. The poppet valve 72 has a shaft 75 extending into the bore 60 to be engaged by the plunger 61 at the end of its stroke toward the diaphragm 59. The cavity 71 is connected by conduit 76 to the chamber 36 of the control valve means 37. As illustrated, the poppet 72 is lifted from its seat during the final movement of the plunger 61 towards the diaphragm 59 to enable the escape of excess water in the chamber 58 and to allow the addition of water to the chamber, if necessary.

Figure 2:
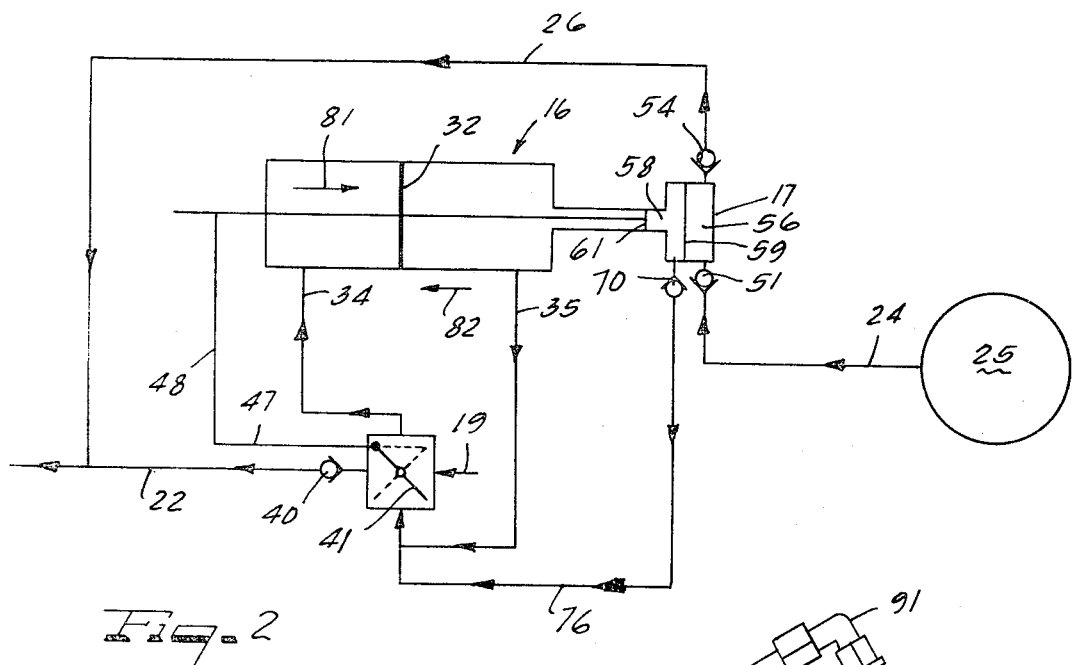
FIG. 2 is a schematic illustration of the operation of the device of the present invention.

The operation of the motor 17 and pump 17 is best explained utilizing the schematic illustration of FIG. 2. With the butterfly valve 41 connected so that the fluid flowing from the conduit 19 flows into the piston port 34 and the fluid flowing through the piston port 35 passes through the check valve 40 of the outlet port 39 to the conduit 22, the piston 32 is forced in the direction of arrow 81. This moves the plunger 61 in the same direction to apply a pressure on the fluid in the chamber 58 and bore 60 forcing the diaphragm 59 towards the right, as illustrated in FIG. 2, to inject fluid out of the lubricant chamber 56 through the check valve 54 and the conduit 26, into the conduit 22 for mixing.

At the completion of the stroke of the piston 32, the linkage 47,48 through the spring 45 shifts the butterfly valve 41 to the position illustrated in dashed lines to connect the piston port 35 to the inlet conduit 19 and piston port 34 to the outlet port 39 and conduit 22. A flow of water through the port 35 shifts the piston in the direction of arrow 82 withdrawing the plunger 61 to release the pressure on the fluid acting on the diaphragm 59 to allow it to return or shift to the left as viewed in FIG. 2 to draw in lubricant through the check valve 51 into the chamber 56. At the completion of a stroke or movement in the direction of arrow 82, the butterfly valve 41 is shifted to the position as illustrated in solid lines to cause the piston to move in the direction of the arrow 81. At this time, the plunger 61 applies pressure to the diaphragm 59 to squeeze or force a metered amount of lubricant out of the chamber 56 through check valve 54.

As mentioned above, the connection between the piston 32 and the plunger 61 is adjustable to vary the travel of the plunger 61 and thus vary the amount of displacement of the diaphragm to change the volume of lubricant being pumped during each pumping stroke. The device 10 is adjustable to provide a range of concentrations. The adjustments and working embodiments enable a change of between ½ ounce to 4½ ounces of concentrated lubricant per gallon of water passing through the motor 16.

As mentioned above, the source of water in conduit 19 is passed through a filter 20 and pressure regulator valve 21 to remove any particles which may damage the moving parts of the motor or cause clogging of the nozzles, and to obtain the desired water pressure. When the water pressure applied to the motor 16 is thirty pounds per square inch, the device 10 will supply a mixture to the nozzles at a rate of four gallons per minute. By adjusting the regulator valve 21 to change the water pressure applied to the motor 16, the speed of the motor is changed to increase its output volume.

Figure 3:
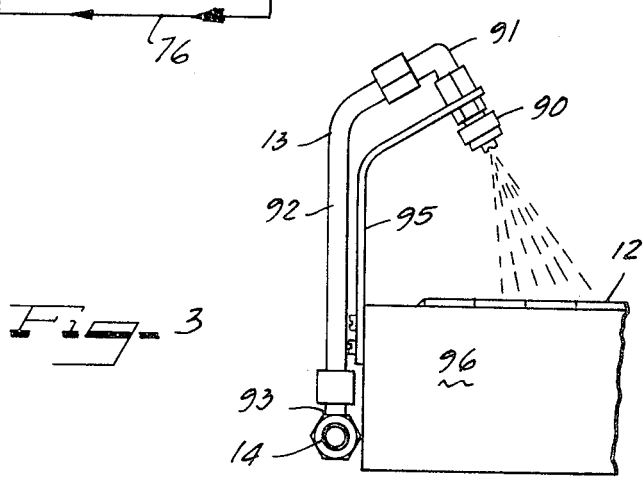
FIG. 3 is a side view of a nozzle of the spray system.

The nozzles 13 are best illustrated in FIG. 3 and comprise a standard nozzle head 90 which is connected through suitable fittings such as an elbow fitting 91, to a conduit 92 which is connected to the common conduit 14 through a Tee fitting 93. As illustrated, the nozzle 13 is supported by a bracket 95 attached to a frame 96 of the conveyor 12 at one end thereof. Preferably, nozzles such as 13, are also located along the conveyor 12 to apply lubricant at intermediate points along the path of the conveyor.

The concentrated lubricant may be any well known lubricating material which meets the criteria for the particular machine on which it is being used for purposes of lubrication. For example, a lubricant must be non-toxic, and not cause any deterioration of any food or beverage in which it may contact. Of course, it would be obvious to those skilled in the art that the nozzles mounted along the conveyor are positioned in a manner to minimize the introduction of the lubricant into any bottles, cans or other items being carried on the conveyor.

Although minor modifications might be suggested by those versed in the art, it should be understood that I wish to employ within the scope of the patent granted hereon all such modifications that reasonably and properly come within the scope of my contribution to the art.

I claim:

1. A device for supplying a mixture of water and lubricant to a conduit of a system of spray nozzles for spraying the mixture upon moving parts including conveyors, chain belts, and trolleys, the device comprising a fluid-actuated motor having a housing with an inlet port for connection to a source of water under pressure and an outlet port for the connection to the conduit of the system of nozzles, said housing having a cylinder with a double acting piston disposed therein, said housing having valve means for controlling the connection of opposite sides of the piston to the inlet and outlet ports of the housing, said motor having a piston rod connected to the piston and extending out of said housing, a pump having a diaphragm disposed across a chamber to form a pair of chamber portions, one of said pair of portions having an inlet port adapted for connection to a supply of liquid lubricant and an outlet port connected to a conduit extending to the outlet port of the fluid motor, the other portion of said pair of portions containing a volume of fluid, said pump including a plunger mounted for reciprocation to apply pressure to the fluid in the other portion to displace the diaphragm and force lubricant from the one portion through the outlet port for discharge into the outlet port of the fluid motor, and means for interconnecting the piston rod and the plunger to reciprocate together, said means being adjustable and including a lost motion connection to enable varying the displacement of the plunger to vary the output of the pump to change the concentration of the lubricant in the mixture wherein the amount of lubricant pumped into the flow water for mixing therewith is directly proportional to the volume of water flowing through the fluid-actuated motor so that the selected concentration of the lubricant in the mixture of lubricant and water remains constant independent of the volume of the mixture being sprayed through the system of nozzles.

2. A device according to claim 1, wherein the fluid motor discharges into a mixing chamber having an outlet port adapted for connection to the conduit extending to the system of spray nozzles so that the water and lubricant metered therein is sufficiently mixed prior to going to the spray nozzles.

3. A device according to claim 1, which further includes pressure regulating means disposed ahead of the inlet port of the fluid motor for regulating the fluid pressure applied thereto to regulate the speed of said motor.

4. In a lubricating system in which a mixture of water and lubricant is sprayed on moving parts including conveyors, chain belts and trolleys, the system including at least one spray nozzle located adjacent the moving parts for spraying the mixture thereon, conduit means for connecting the spray nozzle to a source of water and lubricant mixture, the improvement comprising a fluid-actuated motor having a housing with an inlet port for connection to a source of water under pressure and an outlet port for connection to the conduit means of the system, said housing having a cylinder with a double acting piston disposed therein, said housing having valve means for controlling the connection of opposite sides of the piston to the inlet and outlet ports of the housing, said motor having a piston rod connected to the piston and extending out of said housing, a pump having a diaphragm disposed across a chamber to form a pair of chamber portions, one of said chamber portions having an inlet port adapted for connection to a supply of liquid lubricant and an outlet port connected to a conduit extending to the outlet port of the fluid motor, the other portion of said pair of portions having a volume of fluid therein, said pump including a plunger mounted for reciprocation to apply pressure to the fluid in the other portion to displace the diaphragm and force the lubricant in the one portion out of the outlet port into the outlet port of the fluid motor, and means for interconnecting the piston rod and the plunger to receiprocate together, said means being adjustable and including a lost motion connection to enable varying the displacement of the plunger to vary the output of the pump to change the concentration of the lubricant in the mixture, wherein the amount of lubricant pumped into the flow of water for mixing therewith is directly proportional to the volume of water entering the conduit means so that the selected concentration of the lubricant in the mixture remains constant independent of the volume of mixture being used by the system.

5. In a system according to claim 4, wherein regulator means are provided in the inlet port to the motor for controlling the speed of the motor, and the exhaust of the motor and the output of the pump are conveyed to a mixing chamber prior to entering the conduit means for the system extending to the nozzle to enable mixing of the mixture prior to being sprayed on the moving parts.

* * * * *